(12) United States Patent
Brice

(10) Patent No.: US 6,412,527 B1
(45) Date of Patent: Jul. 2, 2002

(54) AUTOMATED BABY FORMULA BOTTLE FILLER

(76) Inventor: Neal Peter Brice, 17 Squires Road, Shepperton, Middlesex (GB), TW17 0LQ ( * ) Notice: Subject to any disclaimer, the term of this patent is extended or adjusted under 35 U.S.C. 154(b) by 0 days.

(21) Appl. No.: 09/780,010

(22) Filed: Feb. 9, 2001

(51) Int. Cl.[7] .................................................. B65B 3/04
(52) U.S. Cl. ............................ 141/103; 141/69; 141/82
(58) Field of Search .................................. 141/9, 11, 69, 141/70, 82, 85, 100, 103, 104; 222/129.1, 129.2, 129.3, 129.4

(56) References Cited

U.S. PATENT DOCUMENTS

| | | |
|---|---|---|
| 3,133,675 A | 5/1964 | Broadhurst |
| 3,291,034 A | 12/1966 | Sohn et al. |
| D309,843 S | 8/1990 | Reichmann |
| 5,540,263 A * | 7/1996 | Hustveldt et al. ............ 141/104 |
| 5,570,816 A | 11/1996 | La Barbera, Jr. |
| 5,634,714 A | 6/1997 | Guild |
| 5,671,325 A | 9/1997 | Roberson |

* cited by examiner

Primary Examiner—Charles R. Eloshway
Assistant Examiner—Peter deVore

(57) ABSTRACT

An automated baby formula bottle filler for providing formula for a baby's bottle from powdered formula. The automated baby formula bottle filler includes a housing having an interior space. The interior space is for holding water. A motor compartment coupled to the housing. The motor compartment is positioned in the interior space. A first funnel assembly is positioned in the interior space for dispensing baby formula powder. A second funnel assembly is positioned in the interior space for dispensing water. A control panel is coupled to the housing. The control panel includes a powdered formula dispenser control, a water dispenser control.

20 Claims, 3 Drawing Sheets

AUTOMATED BABY FORMULA BOTTLE FILLER

BACKGROUND OF THE INVENTION

1. Field of the Invention

The present invention relates to infant formula preparing devices and more particularly pertains to a new automated baby formula bottle filler for providing formula for a baby's bottle from powdered formula.

2. Description of the Prior Art

The use of infant formula preparing devices is known in the prior art. More specifically, infant formula preparing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,671,325; 5,570,816; 3,133,675; 3,291,034; U.S. Pat. No. Des. 309,843; and U.S. Pat. No. 5,634,714.

While these devices fulfill their respective, particular objectives and requirements, the aforementioned patents do not disclose a new automated baby formula bottle filler. The inventive device includes a housing having an interior space. The interior space is for holding water. A motor compartment coupled to the housing. The motor compartment is positioned in the interior space. A first funnel assembly is positioned in the interior space for dispensing baby formula powder. A second funnel assembly is positioned in the interior space for dispensing water. A control panel is coupled to the housing. The control panel includes a powdered formula dispenser control, a water dispenser control.

In these respects, the automated baby formula bottle filler according to the present invention substantially departs from the conventional concepts and designs of the prior art, and in so doing provides an apparatus primarily developed for the purpose of providing formula for a baby's bottle from powdered formula.

SUMMARY OF THE INVENTION

In view of the foregoing disadvantages inherent in the known types of infant formula preparing devices now present in the prior art, the present invention provides a new automated baby formula bottle filler construction wherein the same can be utilized for providing formula for a baby's bottle from powdered formula.

The general purpose of the present invention, which will be described subsequently in greater detail, is to provide a new automated baby formula bottle filler apparatus and method which has many of the advantages of the infant formula preparing devices mentioned heretofore and many novel features that result in a new automated baby formula bottle filler which is not anticipated, rendered obvious, suggested, or even implied by any of the prior art infant formula preparing devices, either alone or in any combination thereof.

To attain this, the present invention generally comprises a housing having an interior space. The interior space is for holding water. A motor compartment coupled to the housing. The motor compartment is positioned in the interior space. A first funnel assembly is positioned in the interior space for dispensing baby formula powder. A second funnel assembly is positioned in the interior space for dispensing water. A control panel is coupled to the housing. The control panel includes a powdered formula dispenser control, a water dispenser control.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automated baby formula bottle filler apparatus and method which has many of the advantages of the infant formula preparing devices mentioned heretofore and many novel features that result in a new automated baby formula bottle filler which is not anticipated, rendered obvious, suggested, or even implied by any of the prior art infant formula preparing devices, either alone or in any combination thereof.

It is another object of the present invention to provide a new automated baby formula bottle filler which may be easily and efficiently manufactured and marketed.

It is a further object of the present invention to provide a new automated baby formula bottle filler which is of a durable and reliable construction.

An even further object of the present invention is to provide a new automated baby formula bottle filler which is susceptible of a low cost of manufacture with regard to both materials and labor, and which accordingly is then susceptible of low prices of sale to the consuming public, thereby making such automated baby formula bottle filler economically available to the buying public.

Still yet another object of the present invention is to provide a new automated baby formula bottle filler which provides in the apparatuses and methods of the prior art some of the advantages thereof, while simultaneously overcoming some of the disadvantages normally associated therewith.

Still another object of the present invention is to provide a new automated baby formula bottle filler for providing formula for a baby's bottle from powdered formula.

Yet another object of the present invention is to provide a new automated baby formula bottle filler which includes a housing having an interior space. The interior space is for holding water. A motor compartment coupled to the housing. The motor compartment is positioned in the interior space. A first funnel assembly is positioned in the interior space for dispensing baby formula powder. A second funnel assembly is positioned in the interior space for dispensing water. A control panel is coupled to the housing. The control panel includes a powdered formula dispenser control, a water dispenser control.

Still yet another object of the present invention is to provide a new automated baby formula bottle filler that provides and efficient method-of preparing baby formula from powdered formula.

Even still another object of the present invention is to provide a new automated baby formula bottle filler that regulates the temperature of the water used in the making of baby formula to protect a child formula that is to hot.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
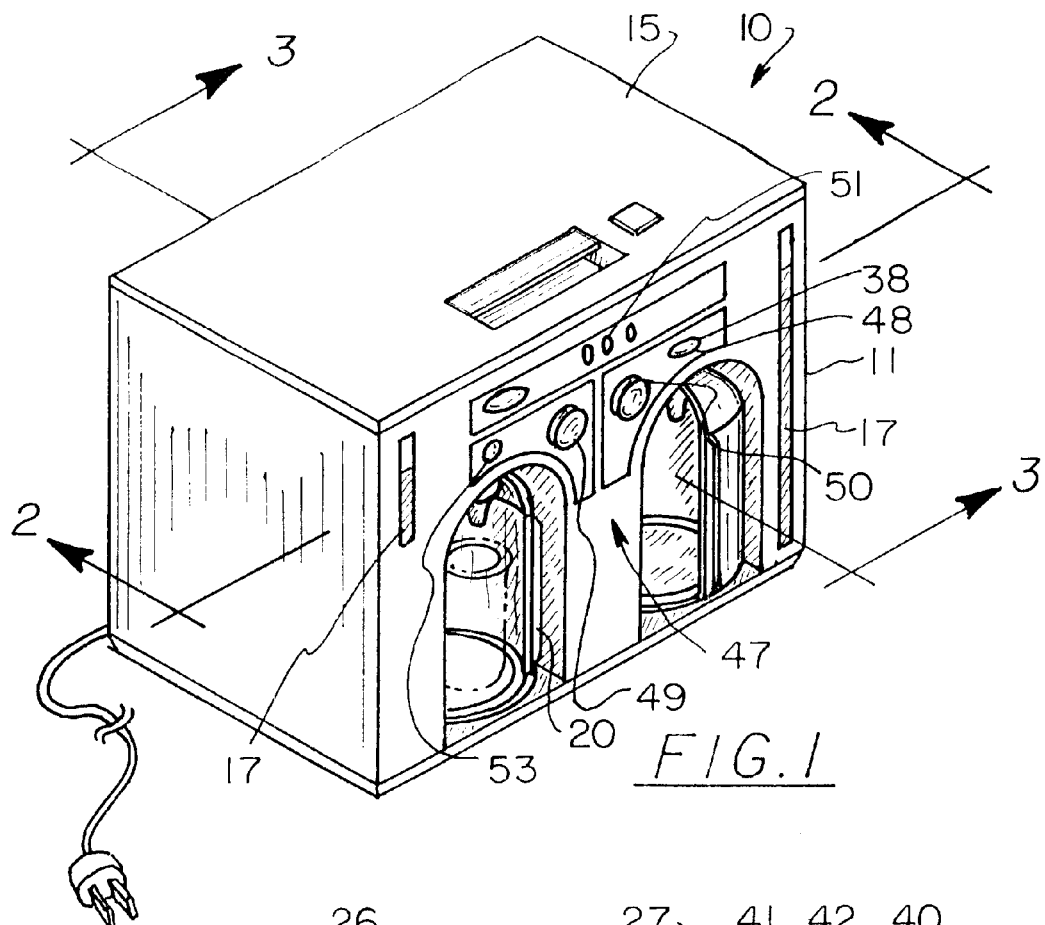
FIG. 1 is a perspective view of a new automated baby formula bottle filler according to the present invention.

With reference now to the drawings, and in particular to FIGS. 1 through 5 thereof, a new automated baby formula bottle filler embodying the principles and concepts of the present invention and generally designated by the reference numeral 10 will be described.

As best illustrated in FIGS. 1 through 5, the automated baby formula bottle filler 10 generally comprises a housing 11 having an interior space 12. The interior space is for holding water. A motor compartment 13 is coupled to the housing. The motor compartment is positioned in the interior space. The housing comprises an opening 14 therein for accessing the interior space of the housing. A lid 15 is hingably coupled to the housing for closing the opening of the housing. The lid comprises a latch 16 for securing the lid to the housing. The housing has a height of about 12 inches, a width of about 14 inches and a height if about 10 inches. Further a front wall of the housing may have transparent windows 17 for determining the remaining amounts of powdered formula and water within the housing.

A first funnel assembly 18 is positioned in the interior space for dispensing baby formula powder. The housing comprises a first bottle filling cavity 19 therein. The first bottle filling cavity is aligned with the first funnel assembly whereby the first funnel assembly is adapted for dispensing powdered baby formula into a baby bottle when the baby bottle is positioned in the first bottle filling cavity. A first door member 20 is slidably coupled to a first set of tracks 21 in the first bottle filling cavity for selectively closing in the baby bottle when the baby bottle is positioned in the first bottle filling cavity.

Figure 3:
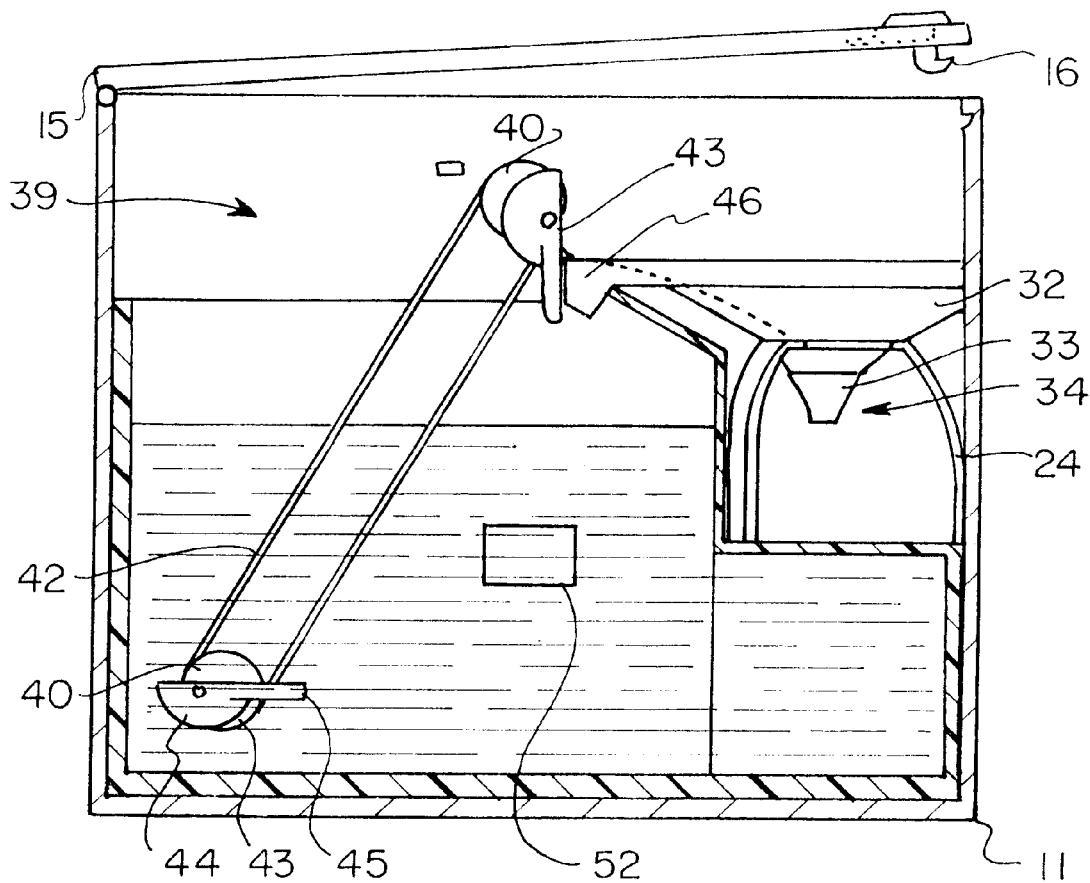
FIG. 3 is a cross-sectional view of the present invention taken along line 3—3 of FIG. 1.

As shown in FIG. 3, a second funnel assembly 22 is positioned in the interior space for dispensing water. The housing comprises a second bottle filling cavity 23 therein. The second bottle filling cavity is aligned with the second funnel assembly whereby the second funnel assembly is adapted for dispensing water into the baby bottle when the baby bottle is positioned in the second bottle filling cavity. A second door member 24 is slidably coupled to a second set of tracks 25 in the second bottle filling cavity for selectively closing in the baby bottle when the baby bottle is positioned in the second bottle filling cavity.

Figure 2:
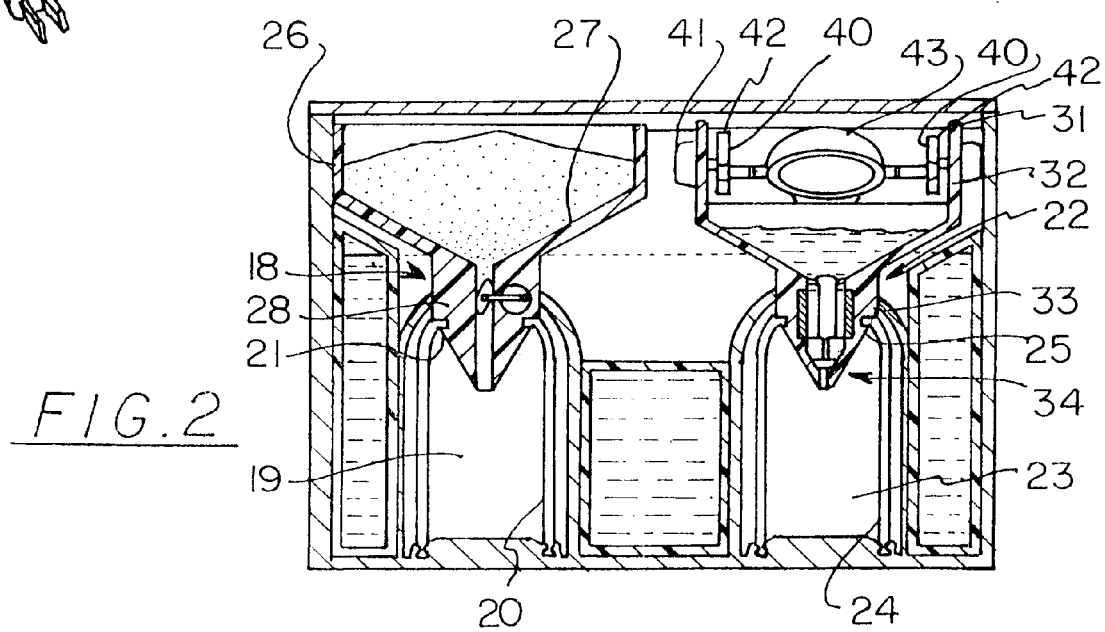
FIG. 2 is a cross-sectional view of the present invention taken along line 2—2 of FIG. 1.
Figure 4:
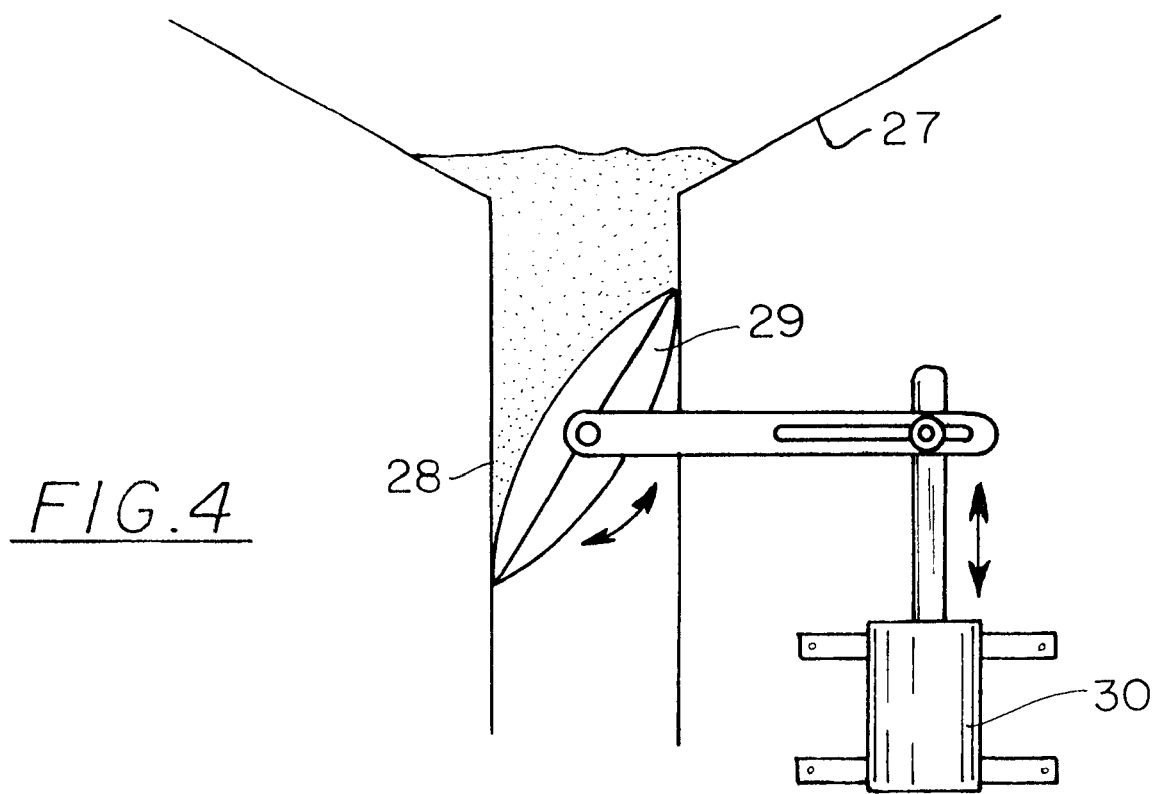
FIG. 4 is an enlarged elevational view of the first funnel assembly of the present invention.

As shown in FIGS. 2 and 4, the first funnel assembly includes a first funnel 26 comprising an upper portion 27 adapted for holding the powdered baby formula and a neck portion 28 extending downwardly from the upper portion of the first funnel. The first funnel assembly includes a butterfly valve 29 positioned in the neck of the first funnel adapted for selectively preventing dispensing of the powdered baby formula through the neck portion of the first funnel. The first funnel assembly includes a formula dispensing motor 30 for pivoting the butterfly valve between an open position defined by the butterfly valve permitting dispensation of the powdered baby formula and a closed position defined by the butterfly valve blocking the neck portion to prevent dispensation of the powdered baby formula through the neck portion of the first funnel.

Figure 5:
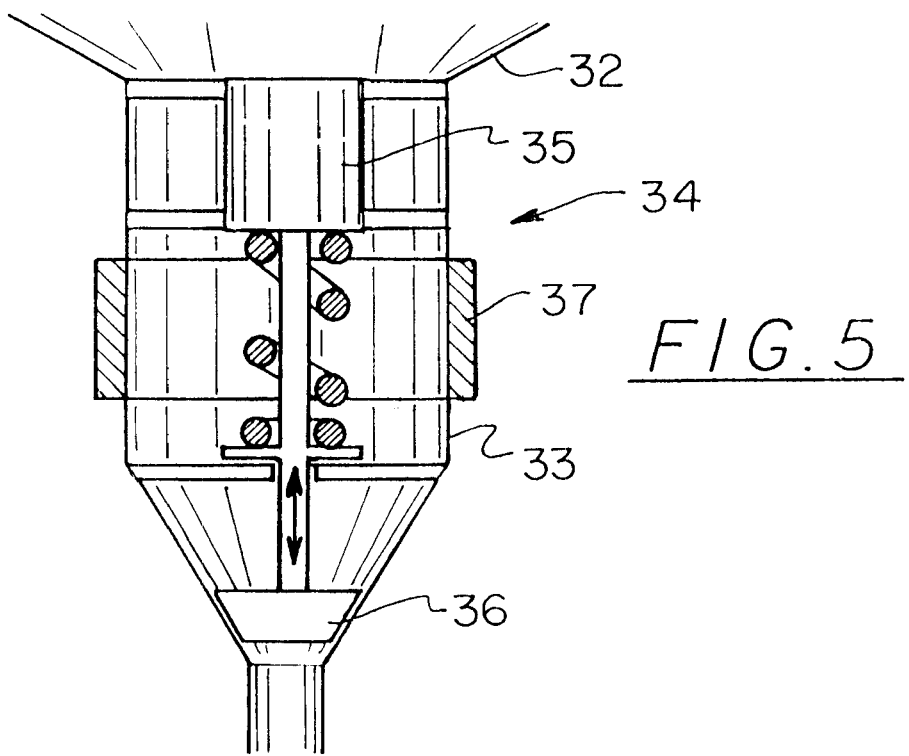
FIG. 5 is an enlarged elevational view of the second funnel assembly of the present invention.

As shown in FIGS. 2 and 5, the second funnel assembly includes a second funnel 31 comprising an upper portion 32 for holding water and a neck portion 33 extending from the upper portion of the second funnel. The second funnel assembly includes a water dispensing assembly 34 positioned in the neck portion of the second funnel. The water dispensing assembly includes a solenoid 35 coupled to a plug member 36. The solenoid is for moving the plug member between a closed position and open position. The closed position is defined by the plug member obstructing the neck portion for preventing dispensing of the water through the neck portion of the second funnel. An open position is defined by the plug member being retracted from an end of the neck portion of the second funnel whereby the water is gravitationally dispensed through the neck portion of the second funnel. The water dispensing assembly includes a coiled heating element 37 for heating the water to a selectable temperature. The control panel includes a heater indicator 38 for indicating when the heating coil is activated.

As shown in FIG. 3, the second funnel assembly further includes a water filling assembly 39 for filling the second funnel with water from the interior of the housing. The water filling assembly includes a plurality of gears 40. A water dispensing motor 41 operationally coupled to the gears. A pair of aligned belts 42 coupled to the gears, and a plurality of ladle members 43 pivotally coupled to extend between the aligned belts. Each of the ladle members comprises a cup portion 44 and a protrusion 45 extending from the cup portion. The upper portion of the second funnel includes a lip portion 46 for contacting the protrusion of each ladle member when the ladle member approaches the second funnel whereby the cup portion is tipped to dispense water in the cup portion into the second funnel.

As shown in FIG. 1, a control panel 47 is coupled to the housing. The control panel includes a heater on/off control 48, a powdered formula dispenser control 49 and a water dispenser control 50. The control panel further includes an amount selector 51 operationally coupled to the powdered formula dispenser and the formula dispensing motor for opening the butterfly valve for a selectable pre-determined time period for facilitating preparation of a desired amount of baby formula.

As shown in FIG. 3, a sterilization contact 52 is positioned in the interior space for contacting the water in the interior space. The sterilization contact is energizable for providing a charge to the water for facilitating sterilization of the water. The control panel includes a sterilization indicator light 53 for indicating that sterilization is in process.

In use, the user places a baby bottle in the first bottle filling cavity and closes the first door. The user then selects the amount of formula needed for the bottle. Depression of the powdered formula dispenser control dispenses powdered formula into the baby bottle. The baby bottle is then removed from the first bottle filling cavity and placed in the second bottle filling cavity and the door of the second bottle filing cavity is closed. The heater on/off control is depressed so that the water is heated prior to being dispersed. The water dispenser control is then depressed and an amount of water is transferred from the interior space into the baby bottle. The baby bottle is then removed from the second bottle filling cavity and given to the baby.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baby formula preparing machine comprising:
   a housing having an interior space, said interior space being for holding water;
   a motor compartment coupled to said housing, said motor compartment being positioned in said interior space;
   a first funnel assembly positioned in said interior space for dispensing baby formula powder;
   a second funnel assembly positioned in said interior space for dispensing water;
   a control panel coupled to said housing, said control panel including a powdered formula dispenser control, a water dispenser control;
   wherein said housing has a first bottle filling cavity therein, said first bottle filling cavity being aligned with said first funnel assembly whereby said first funnel assembly is adapted for dispensing powdered baby formula into a baby bottle when the baby bottle is positioned in said first bottle filling cavity; and
   a first door member slidably coupled to a first set of tracks in said first bottle filling cavity for selectively closing in the baby bottle when the baby bottle is positioned in the first bottle filling cavity.

2. The baby formula preparing machine as set forth in claim 1 wherein said housing has a second bottle filling cavity therein, said second bottle filling cavity being aligned with said second funnel assembly whereby said second funnel assembly is adapted for dispensing water into the baby bottle when the baby bottle is positioned in said second bottle filling cavity.

3. The baby formula preparing machine as set forth in claim 1 wherein said first funnel assembly includes a first funnel having an upper portion adapted for holding the powdered baby formula and a neck portion extending downwardly from said upper portion of said first funnel.

4. The baby formula preparing machine as set forth in claim 1 wherein said second funnel assembly includes a second funnel having an upper portion for holding water and a neck portion extending from the upper portion of the second funnel.

5. The baby formula preparing machine as set forth in claim 1 wherein said housing has an opening therein for accessing said interior space of said housing, a lid being hingably coupled to said housing for closing said opening of said housing, said lid having a latch for securing said lid to said housing.

6. A baby formula preparing machine comprising:
   a housing having an interior space, said interior space being for holding water;
   a motor compartment coupled to said housing, said motor compartment being positioned in said interior space;
   a first funnel assembly positioned in said interior space for dispensing baby formula powder;
   a second funnel assembly positioned in said interior space for dispensing water;
   a control panel coupled to said housing, said control panel including a powdered formula dispenser control, a water dispenser control;
   wherein said housing has a second bottle filling cavity therein, said second bottle filling cavity being aligned with said second funnel assembly whereby said second funnel assembly is adapted for dispensing water into the baby bottle when the baby bottle is positioned in said second bottle filling cavity; and
   a second door member slidably coupled to a second set of tracks in said second bottle filling cavity for selectively closing in the baby bottle when the baby bottle is positioned in the second bottle filling cavity.

7. A baby formula preparing machine comprising:
   a housing having an interior space, said interior space being for holding water;
   a motor compartment coupled to said housing, said motor compartment being positioned in said interior space;
   a first funnel assembly positioned in said interior space for dispensing baby formula powder;
   a second funnel assembly positioned in said interior space for dispensing water;
   a control panel coupled to said housing, said control panel including a powdered formula dispenser control, a water dispenser control;

wherein said first funnel assembly includes a first funnel having an upper portion adapted for holding the powdered baby formula and a neck portion extending downwardly from said upper portion of said first funnel; and wherein said first funnel assembly includes a butterfly valve positioned in said neck of said first funnel adapted for selectively preventing dispensing of the powdered baby formula through said neck portion of said first funnel.

8. The baby formula preparing machine as set forth in claim 7 wherein said first funnel assembly includes a formula dispensing motor for pivoting said butterfly valve between an open position defined by said butterfly valve permitting dispensation of the powdered baby formula and a closed position defined by said butterfly valve blocking said neck portion to prevent dispensation of the powdered baby formula through the neck portion of the first funnel.

9. The baby formula preparing machine as set forth in claim 8 wherein said control panel has an amount selector operationally coupled to said powdered formula dispenser and said formula dispensing motor for opening said butterfly valve for a selectable pre-determined time period for facilitating preparation of a desired amount of baby formula.

10. The baby formula preparing machine as set forth in claim 7 wherein said housing has an opening therein for accessing said interior space of said housing, a lid being hingably coupled to said housing for closing said opening of said housing, said lid having a latch for securing said lid to said housing.

11. A baby formula preparing machine comprising:
   a housing having an interior space, said interior space being for holding water;
   a motor compartment coupled to said housing, said motor compartment being positioned in said interior space;
   a first funnel assembly positioned in said interior space for dispensing baby formula powder;
   a second funnel assembly positioned in said interior space for dispensing water;
   a control panel coupled to said housing, said control panel including a powdered formula dispenser control, a water dispenser control;
   wherein said second funnel assembly includes a second funnel having an upper portion for holding water and a neck portion extending from the upper portion of the second funnel; and
   wherein said second funnel assembly includes a water dispensing assembly positioned in said neck portion of said second funnel, said water dispensing assembly including a solenoid coupled to a plug member, said solenoid being for moving said plug member between a closed position defined by said plug member obstructing said neck portion for preventing dispensing of the water through said neck portion of said second funnel and an open position defined by said plug member being retracted from an end of said neck portion of said second funnel whereby the water is gravitationally dispensed through said neck portion of said second funnel.

12. The baby formula preparing machine as set forth in claim 11 wherein said water dispensing assembly includes a coiled heating element for heating the water to a selectable temperature.

13. The baby formula preparing machine as set forth in claim 12 wherein said control panel including a heater on/off control and a heater indicator, said heater indicator being for indicating when said heating coil is activated.

14. The baby formula preparing machine as set forth in-claim 11 wherein said second funnel assembly further includes a water filling assembly for filling said second funnel with water from said interior of said housing, said water filling assembly including a plurality of gears, a water dispensing motor operationally coupled to said gears, a pair of aligned belts coupled to said gears, and a plurality of ladle members pivotally coupled to extend between said aligned belts.

15. The baby formula preparing machine as set forth in claim 14 wherein each of said ladle members has a cup portion and a protrusion extending from said cup portion, said upper portion of said second funnel including a lip portion for contacting said protrusion of each ladle member when said ladle member approaches said second funnel whereby said cup portion is tipped to dispense water in said cup portion into said second funnel.

16. The baby formula preparing machine as set forth in claim 11 wherein said housing has an opening therein for accessing said interior space of said housing, a lid being hingably coupled to said housing for closing said opening of said housing, said lid having a latch for securing said lid to said housing.

17. A baby formula preparing machine comprising:
   a housing having an interior space, said interior space being for holding water;
   a motor compartment coupled to said housing, said motor compartment being positioned in said interior space;
   a first funnel assembly positioned in said interior space for dispensing baby formula powder;
   a second funnel assembly positioned in said interior space for dispensing water;
   a control panel coupled to said housing, said control panel including a powdered formula dispenser control, a water dispenser control; and
   a sterilization contact positioned in said interior space for contacting the water in the interior space, said sterilization contact being energizable for providing a charge to the water for facilitating sterilization of the water.

18. The baby formula preparing machine as set forth in claim 17 wherein said control panel includes a sterilization indicator light for indicating that sterilization is in process.

19. The baby formula preparing machine as set forth in claim 17 wherein said housing has an opening therein for accessing said interior space of said housing, a lid being hingably coupled to said housing for closing said opening of said housing, said lid having a latch for securing said lid to said housing.

20. A baby formula preparing machine comprising:
   a housing having an interior space, said interior space being for holding water;
   a motor compartment coupled to said housing, said motor compartment being positioned in said interior space;
   a first funnel assembly positioned in said interior space for dispensing baby formula powder;
   a second funnel assembly positioned in said interior space for dispensing water;
   said housing having a first bottle filling cavity therein, said first bottle filling cavity being aligned with said first funnel assembly whereby said first funnel assembly is adapted for dispensing powdered baby formula into a baby bottle when the baby bottle is positioned in said first bottle filling cavity;
   said housing having a second bottle filling cavity therein, said second bottle filling cavity being aligned with said second funnel assembly whereby said second funnel assembly is adapted for dispensing water into the baby bottle when the baby bottle is positioned in said second bottle filling cavity;

said first funnel assembly including a first funnel having an upper portion adapted for holding the powdered baby formula and a neck portion extending downwardly from said upper portion of said first funnel;

said first funnel assembly including a butterfly valve positioned in said neck of said first funnel adapted for selectively preventing dispensing of the powdered baby formula through said neck portion of said first funnel;

said first funnel assembly including a formula dispensing motor for pivoting said butterfly valve between an open position defined by said butterfly valve permitting dispensation of the powdered baby formula and a closed position defined by said butterfly valve blocking said neck portion to prevent dispensation of the powdered baby formula through the neck portion of the first funnel;

said second funnel assembly including a second funnel having an upper portion for holding water and a neck portion extending from the upper portion of the second funnel;

said second funnel assembly including a water dispensing assembly positioned in said neck portion of said second funnel, said water dispensing assembly including a solenoid coupled to a plug member, said solenoid being for moving said plug member between a closed position defined by said plug member obstructing said neck portion for preventing dispensing of the water through said neck portion of said second funnel and an open position defined by said plug member being retracted from an end of said neck portion of said second funnel whereby the water is gravitationally dispensed through said neck portion of said second funnel;

said water dispensing assembly including a coiled heating element for heating the water to a selectable temperature;

said second funnel assembly further including a water filling assembly for filling said second funnel with water from said interior of said housing, said water filling assembly including a plurality of gears, a water dispensing motor operationally coupled to said gears, a pair of aligned belts coupled to said gears, and a plurality of ladle members pivotally coupled to extend between said aligned belts;

each of said ladle members having a cup portion and a protrusion extending from said cup portion;

said upper portion of said second funnel including a lip portion for contacting said protrusion of each ladle member when said ladle member approaches said second funnel whereby said cup portion is tipped to dispense water in said cup portion into said second funnel;

a first door member slidably coupled to a first set of tracks in said first bottle filling cavity for selectively closing in the baby bottle when the baby bottle is positioned in the first bottle filling cavity;

a second door member slidably coupled to a second set of tracks in said second bottle filling cavity for selectively closing in the baby bottle when the baby bottle is positioned in the second bottle filling cavity;

a control panel coupled to said housing, said control panel including a heater on/off control, a powdered formula dispenser control, a water dispenser control, an amount selector operationally coupled to said powdered formula dispenser and said formula dispensing motor for opening said butterfly valve for a selectable predetermined time period for facilitating preparation of a desired amount of baby formula;

a sterilization contact positioned in said interior space for contacting the water in the interior space, said sterilization contact being energizable for providing a charge to the water for facilitating sterilization of the water;

said control panel including a sterilization indicator light for indicating the sterilization is in process;

said control panel including a heater indicator for indicating when said heating coil is activated;

said housing having an opening therein for accessing said interior space of said housing; and a lid being hingably coupled to said housing for closing said opening of said housing, said lid having a latch for securing said lid to said housing.

* * * * *